(12) United States Patent
Vogel et al.

(10) Patent No.: US 11,397,864 B2
(45) Date of Patent: Jul. 26, 2022

(54) MULTI-POSITIONAL SWITCH USING PASSIVE WIRELESS TAGS AND SYSTEMS AND METHODS FOR USING A MULTI-POSITIONAL SWITCH THAT USES PASSIVE WIRELESS TAGS

(71) Applicants: Daniel John Vogel, Waterloo (CA); Keiko Katasuragawa, Waterloo (CA); Omid Salehi Abari, Waterloo (CA)

(72) Inventors: Daniel John Vogel, Waterloo (CA); Keiko Katasuragawa, Waterloo (CA); Omid Salehi Abari, Waterloo (CA)

(*) Notice: Subject to any disclaimer, the term of this patent is extended or adjusted under 35 U.S.C. 154(b) by 0 days.

(21) Appl. No.: 17/494,172

(22) Filed: Oct. 5, 2021

(65) Prior Publication Data

US 2022/0108091 A1    Apr. 7, 2022

Related U.S. Application Data

(60) Provisional application No. 63/204,429, filed on Oct. 5, 2020.

(51) Int. Cl.
| | |
|---|---|
| *G06K 7/08* | (2006.01) |
| *G06K 7/10* | (2006.01) |
| *G06K 19/07* | (2006.01) |
| *G06K 19/077* | (2006.01) |

(52) U.S. Cl.
CPC ..... *G06K 7/10366* (2013.01); *G06K 19/0709* (2013.01); *G06K 19/07773* (2013.01)

(58) Field of Classification Search
CPC .......... G06K 7/10366; G06K 19/0709; G06K 19/07773
USPC ........................................ 235/451
See application file for complete search history.

(56) References Cited

U.S. PATENT DOCUMENTS

| | | | |
|---|---|---|---|
| 9,495,852 B1* | 11/2016 | Colby .............. | G06K 19/07749 |
| 2016/0012329 A1* | 1/2016 | Machado ............... | H01Q 9/065 |
| | | | 235/492 |
| 2019/0363698 A1* | 11/2019 | Nosaka .................... | H04B 1/44 |

* cited by examiner

*Primary Examiner* — Ahshik Kim
(74) *Attorney, Agent, or Firm* — Bhole IP Law; Anil Bhole; Marc Lampert

(57) ABSTRACT

Provided is a system, method, and multi-positional switch using a passive wireless tag to communicate with a wireless tag reader. The wireless tag including: a first set of one or more half-antennas; a second set of one or more half-antennas; and a first set of two or more wireless chips and an electrical contact connected to an open end of each of the wireless chips, each of the wireless chips including data stored thereon, and when one of the electrical contacts completes an antenna circuit including one of the first set of half-antennas and one of the second set of half antennas, the wireless tag reader energizes the completed antenna circuit and the completed antenna circuit transmits the data stored on the wireless chip connected to the electrical contact that is completing the antenna circuit to the wireless tag reader.

20 Claims, 11 Drawing Sheets

US 11,397,864 B2

MULTI-POSITIONAL SWITCH USING PASSIVE WIRELESS TAGS AND SYSTEMS AND METHODS FOR USING A MULTI-POSITIONAL SWITCH THAT USES PASSIVE WIRELESS TAGS

TECHNICAL FIELD

The following relates generally to input devices and more specifically to a multi-positional switch using passive wireless tags and systems and methods for using a multi-positional switch that uses passive wireless tags.

BACKGROUND

Radio-frequency-identification (RFID) is an automatic identification and data capture mechanism using the radio frequency electromagnetic field. Passive RFID tags are battery-free, typically low cost (e.g., few cents) and commonly used in settings like retail stores to prevent shoplifting and track inventory levels of individual items. Each passive RFID tag stores a unique identification (ID). An RFID reader can read the ID from a relatively long distance (e.g., up to 10 m).

SUMMARY

In one aspect, there is provided a multi-positional switch using a passive wireless tag to communicate with a wireless tag reader, the wireless tag comprising: a first set of one or more half-antennas; a second set of one or more half-antennas; and a first set of two or more wireless chips and an electrical contact connected to an open end of each of the wireless chips, each of the wireless chips comprising data stored thereon, and when one of the electrical contacts completes an antenna circuit comprising one of the first set of half-antennas and one of the second set of half antennas, the wireless tag reader energizes the completed antenna circuit and the completed antenna circuit transmits the data stored on the wireless chip that is connected to the electrical contact that is completing the antenna circuit to the wireless tag reader.

In a particular case, the first set of two or more wireless chips are connected to the first set of one or more half-antennas, and further comprising a second set of two or more wireless chips and an electrical contact connected to an open end of each of the second set of two or more wireless chips, each of the second set of two or more wireless chips comprising data stored thereon, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

In another case, each half-antenna in the first set of one or more half-antennas comprises an electrical contact, and wherein the first set of two or more wireless chips are each connected to parallel branches of the half-antennas in the second set of one or more half-antennas, and wherein one of the electrical contacts of the first set of two or more wireless chips completes the antenna circuit when physically contacted with the electrical contact connected to the half-antenna in the first set of one or more half-antennas.

In yet another case, the first set of two or more wireless chips and the connected electrical contacts are external to the first set of one or more half-antennas and the second set of one or more half-antennas.

In yet another case, the multi-positional switch further comprising a second set of two or more wireless chips and an electrical contact connected to an open end of each of the second set of two or more wireless chips, each of the second set of two or more wireless chips comprising data stored thereon, the second set of two or more wireless chips are each connected to parallel branches of the half-antennas in the second set of one or more half-antennas, and wherein the first set of two or more wireless chips are each connected to parallel branches of the half-antennas in the first set of one or more half-antennas, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

In yet another case, the first set of two or more wireless chips and the connected electrical contacts are external to the first set of one or more half-antennas and the second set of one or more half-antennas, and wherein a first antenna circuit comprises one of the half-antennas in the first set of half-antennas partially connected with one of the half-antennas in the second set of half-antennas, the first antenna circuit further comprising a first proximal wireless chip and an electrical contact connected to an open end of the first proximal wireless chip, the first proximal wireless chip comprising data stored thereon, and wherein a second antenna circuit comprises a further one of the half-antennas in the first set of half-antennas partially connected with a further one of the half-antennas in the second set of half-antennas, the second antenna circuit further comprising a second proximal wireless chip and an electrical contact connected to an open end of the second proximal wireless chip, the second proximal wireless chip comprising data stored thereon, and wherein one of the electrical contacts of the first set of two or more wireless chips completes the antenna circuit when physically contacted with either the electrical contact connected to the first proximal wireless chip or the second proximal wireless chip, transmitting the data stored on both the wireless chips that are connected to the contacted electrical contacts.

In yet another case, the first set of one or more half-antennas are positioned on a first body part of a user and the second set of one or more half-antennas are positioned on a second body part of a user, and wherein the first set of two or more wireless chips and connected electrical contacts are connected to either the first set of one or more half-antennas or the second set of one or more half-antennas, allowing the user to make a selection by completing the antenna circuit by bringing the one of the half-antennas in the first set of one or more half-antennas in contact with one of the half-antennas in the second set of one or more half-antennas.

In yet another case, the first body part comprises a finger of the user and the second body part comprises a thumb of the user.

In yet another case, the first set of one or more half-antennas are mounted on the finger of a glove and the second set of one or more half-antennas are mounted on the thumb of the glove.

In yet another case, the first set of one or more half-antennas are mounted on a temporary tattoo attached to the finger of the user and the second set of one or more half-antennas are mounted on a temporary tattoo attached to the thumb of the user.

In yet another case, each wireless chip in the first set of two or more wireless chips are attached to an article of a separate user and the first set of half-antennas and the second set of half-antennas are mounted on an object, the data stored on the wireless chips useable to determine which user is causing the electrical contacts to complete the antenna circuit.

In yet another case, each wireless chip in the first set of two or more wireless chips are mounted to a separate object and the first set of half-antennas and the second set of half-antennas are attached to an article of a user, the data stored on the wireless chips useable to determine which object the user is touching to cause the electrical contacts to complete the antenna circuit.

In yet another case, the multi-positional switch further comprising a second set of two or more wireless chips and an electrical contact connected to an open end of each of the second set of two or more wireless chips, each of the second set of two or more wireless chips comprising data stored thereon, and wherein each antenna in the first set of half-antennas, and an associated wireless chip from the first set of two or more wireless chips, are mounted to a separate object, and wherein each antenna in the second set of half-antennas, and an associated wireless chip from the second set of two or more wireless chips, are attached to an article of a separate user, the data stored on the wireless chips useable to determine which user is causing the electrical contacts to complete the antenna circuit and which object such user is touching.

In another aspect, there is provided a system for multi-positional switching using passive wireless tags to communicate with a wireless tag reader, the wireless tag comprising a first set of one or more half-antennas, a second set of one or more half-antennas, and a first set of two or more wireless chips and an electrical contact connected to an open end of each of the wireless chips, each of the wireless chips comprising data stored thereon, and when one of the electrical contacts completes an antenna circuit comprising one of the first set of half-antennas and one of the second set of half antennas, the wireless tag reader energizes the completed antenna circuit and the completed antenna circuit transmits the data stored on the wireless chip connected to the electrical contact that is completing the antenna circuit to the wireless tag reader, the system comprising one or more processors in communication with a data storage, the one or more processors configurable to execute: an input module to receive the transmitted data from the wireless chip reader; a tag processing module to compare the received data against data stored in the data storage, the received data in the data storage associated with the corresponding electrical contact in order to identify which one of the electrical contacts completed the circuit; and an output module to output the identified electrical contact.

In yet another aspect, there is provided a method for multi-positional switching using passive wireless tags to communicate with a wireless tag reader, the wireless tag comprising a first set of one or more half-antennas, a second set of one or more half-antennas, and a first set of two or more wireless chips and an electrical contact connected to an open end of each of the wireless chips, each of the wireless chips comprising data stored thereon, and when one of the electrical contacts completes an antenna circuit comprising one of the first set of half-antennas and one of the second set of half antennas, the wireless tag reader energizes the completed antenna circuit and the completed antenna circuit transmits the data stored on the wireless chip connected to the electrical contact that is completing the antenna circuit to the wireless tag reader, the method comprising: receiving the transmitted data from the wireless chip reader; comparing the received data against data stored on a database, the stored data associated with the corresponding electrical contact in order to identify which one of the electrical contacts completed the circuit; and outputting the identified electrical contact.

These and other aspects are contemplated and described herein. It will be appreciated that the foregoing summary sets out representative aspects of systems, methods, multi-positional switches, and wireless tags to assist skilled readers in understanding the following detailed description.

DESCRIPTION OF THE DRAWINGS

A greater understanding of the embodiments will be had with reference to the Figures, in which.

DETAILED DESCRIPTION

Figure 1:
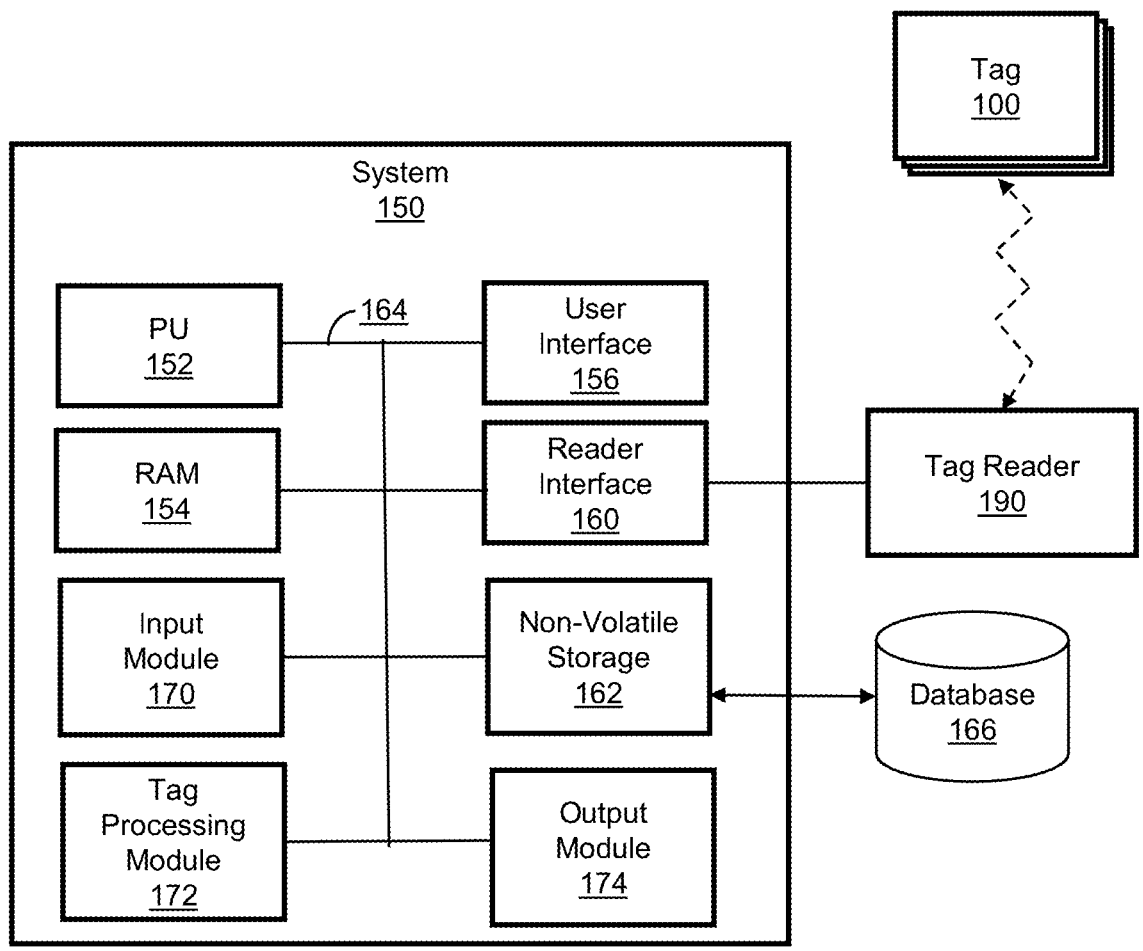
FIG. 1 illustrates a block diagram of an exemplary embodiment of a system for using a multi-positional switch that uses passive wireless tags, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Generally, a passive RFID tag includes a chip (i.e., an integrated circuit) and an antenna. The antenna receives the reader's radio wave output and is also used to power up the chip. If the chip is de-coupled from the antenna or the part of the antenna is missing, the RFID tag cannot respond to the reader. However, the present inventors recognized the substantial advantage of using this feature as a switch, or for disabling operation of the tag by detaching the chip from the antenna.

The present embodiments advantageously exploit the coupling mechanism between the RFID chip and the antenna. Other implementations for using RFID tags as a switch generally required a full RFID tag (one antenna and one chip) for each switch state, which can make such designs relatively large. In contrast, embodiments of the present disclosure employ an RFID tag with a matrix of chips to detect switch states. This approach advantageously allows for a more compact, lightweight, and smaller design; for example, that can be implemented on the fingertips of a user.

Turning to FIG. 1, a system 150 for using a multi-positional switch that uses passive wireless tags is shown, according to an embodiment. In this embodiment, the system 150 is run on a local computing device. In further embodiments, the system 150 can be run on any other computing device; for example, a microcontroller, a dedicated piece of hardware, a laptop computer, a smartphone, a tablet, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 can have a number of physical and logical components, including a processing unit ("PU") 152 (comprising one or more processors), random access memory ("RAM") 154, a user interface 156, a reader interface 160, non-volatile storage 162, and a local bus 164 enabling the PU 152 to communicate with the other components. The PU 152 can execute an operating system, and various modules, or can execute the various modules directly. RAM 154 provides relatively responsive volatile storage to the PU 152. The user interface 156 enables an administrator or user to interact with the system 150. The reader interface 160 is used to communicate with a wireless tag reader 190 (such as an RFID tag reader) to receive signals from the wireless tags 100. The wireless tags can be RFID tags, or any other suitable wireless identification tags.

Non-volatile storage 162 stores the operating system and/or instructions for executing the modules, as well as any data used by these services. In some cases, additional stored data can be stored in a database 166. During operation of the system 150, the instructions and the related data may be retrieved from the non-volatile storage 162 and placed in RAM 154 to facilitate execution.

In an embodiment, the system 150 further includes a number of functional modules to be executed on the PU 152; for example, an input module 170, a tag processing module 172, and an output module 174. In further cases, the functions of the modules can be combined or executed by other modules.

Figure 2:
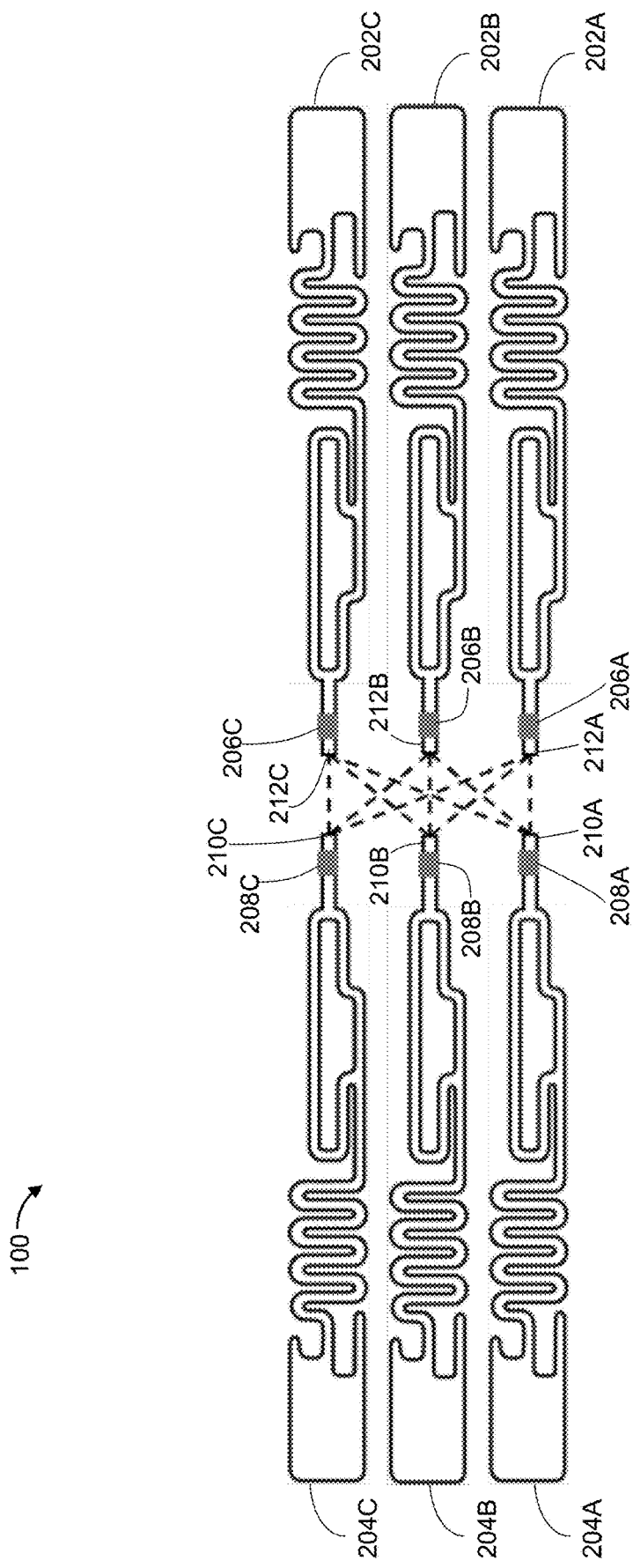
FIG. 2 illustrates a diagram for a wireless tag arrangement for a multi-positional switch, in accordance with an embodiment.

FIGS. 2 to 6 illustrate arrangements for the wireless tags 100, in accordance with respective embodiments. FIG. 2 illustrates a wireless tag 100 arrangement in accordance with an embodiment. In this embodiment, there are six 'half-antennas' in a three-by-three matrix. On a first-side of the matrix, there are three half-antennas 202A, 202B, 202C, and on a second-side of the matrix, there are three corresponding half-antennas 204A, 204B, 204C. Connected to each of the first-side of half-antennas 202A, 202B, 202C is a first set of wireless chips 206A, 206B, 206C and connected to each of the second-side of half-antennas 204A, 204B, 204C is a second set of wireless chips 208A, 208B, 208C. Connected to each of the first-side of half-antennas 202A, 202B, 202C is a first set of electrical contacts 212A, 212B, 212C and connected to each of the second-side of half-antennas 204A, 204B, 204C is a second set of electrical contacts 210A, 210B, 210C. It is understood that the completed antenna can use any suitable antenna design that can be split into half-antennas; for example, the present inventors tested the present embodiments using a dipole antenna and using a condensed tag antenna.

Each of the wireless chips 206A, 206B, 206C, 208A, 208B, 208C comprises an electrical circuit with stored data to be transmittable on the antennas. Alone, each of the half-antennas 202A, 202B, 202C, 204A, 204B, 204C are unable to be powered by the tag reader, and thus, unable to transmit any data. However, when one of the first set of electrical contacts 212A, 212B, 212C comes into physical contact with one of the second set of electrical contacts 210A, 210B, 210C, the electrical circuit is completed and the tag reader 190 is able to energize the now completed antenna circuit. With the energized antenna, the stored data on the first set of wireless chips 206A, 206B, 206C associated with the contacted electrical contact 212A, 212B, 212C and the stored data on the second set of wireless chips 208A, 208B, 208C associated with the other contacted electrical contact 210A, 210B, 210C are transmitted on the now completed antenna circuit.

In this embodiment, the three-by-three matrix of half-antennas act like a switch that is useable to identify which electrical contacts were contacted. For example, when the first first-side contact 212A is contacted with the second second-side contact 210B, the respective half-antennas 202A and 204B are energized, and the stored data on the wireless chips 206C and 208B, and only this stored data, are transmitted to the tag reader 190.

While the embodiment illustrated in FIG. 2 shows a three-by-three half-antenna matrix, it is understood that the half-antenna matrix of this embodiment could be two-by-two, four-by-four, and so on, as suitable.

Figure 7:
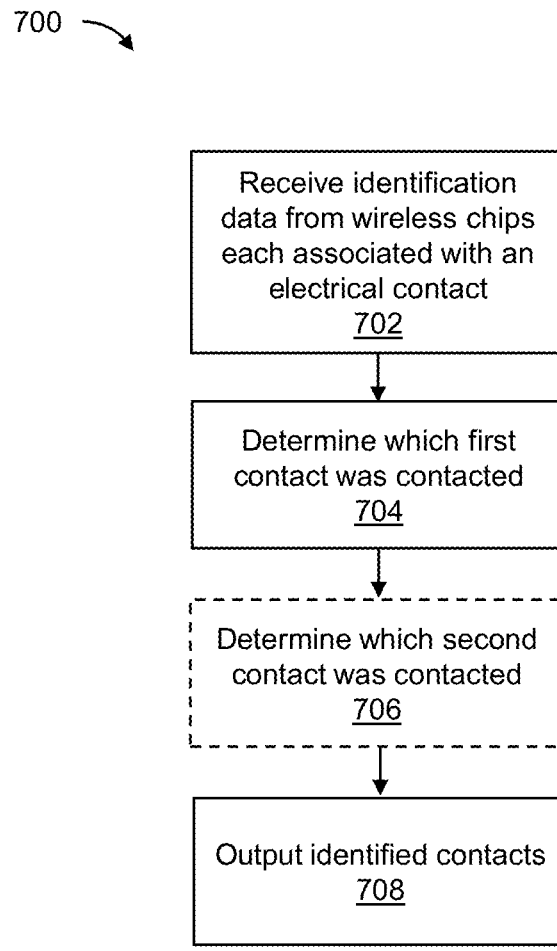
FIG. 7 illustrates an exemplary flow chart block diagram of a method for using a multi-positional switch that uses passive wireless tags, in accordance with an embodiment.

Referring to FIG. 7, a flow diagram of a method 700 for using a multi-positional switch that uses passive wireless tags is shown, according to an embodiment. At block 702, the input module 170 receives the transmitted stored data via the reader interface 160. The transmitted data from one of the first set of wireless chips 206A, 206B, 206C and one of the second set of wireless chips 208A, 208B, 208C. At block 704, the tag processing module 172 matches the stored data from a respective one of the first set of wireless chips 206A, 206B, 206C against data associated with each wireless chip stored on the database 166. In this way, the tag processing module 172 can identify which one of the first set of electrical contacts 212A, 212B, 212C was contacted. At block 706, in some cases (such as in the embodiments illustrated in FIG. 2), the tag processing module 172 matches the received data from a respective one of the second set of wireless chips 208A, 208B, 208C against data associated with each wireless chip stored on the database 166. In this way, the tag processing module 172 can also identify which one of the second set of electrical contacts 210A, 210B, 210C was contacted. At block 708, the output module 174 outputs the identification of the contacts that were contacted to, for example, the user interface 156 or the database 166.

Figure 3:
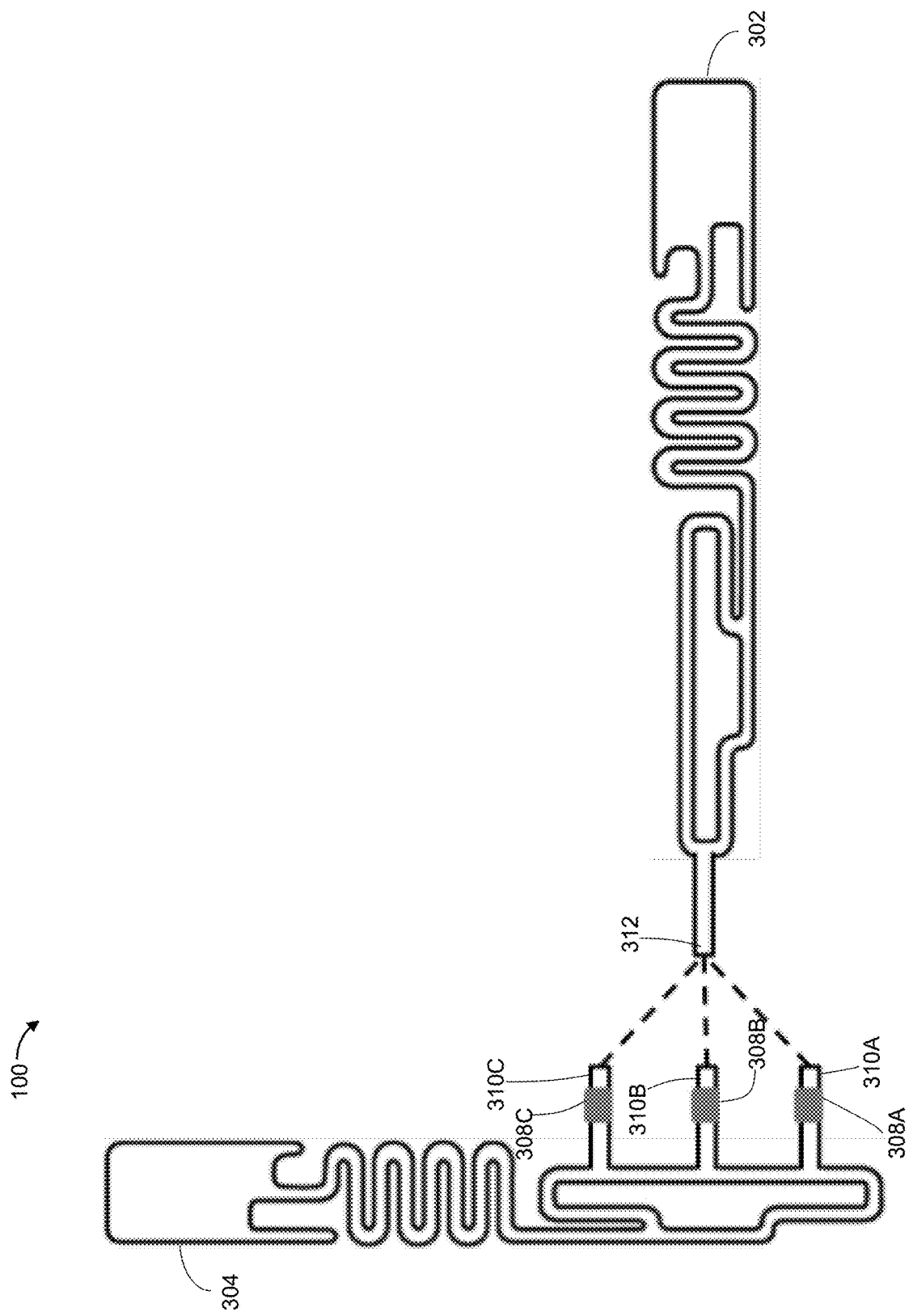
FIG. 3 illustrates a diagram for a wireless tag arrangement for a multi-positional switch, in accordance with another embodiment.

FIG. 3 illustrates a wireless tag 100 arrangement in accordance with another embodiment. In this embodiment, there are two half-antennas, a first half-antenna 302 and a second half-antenna 304. Connected to the first half-antenna 302 is a first electrical contact 312. Connected to the second half-antenna 304 is a set of wireless chips 308A, 308B, 308C arranged in parallel branches. Connected to the first half-antenna 302 are a second set of electrical contacts 310A, 310B, 310C, with each electrical contact 310A, 310B, 310C on a respective one of the parallel branches.

Again, each of the half-antennas 302, 304 alone are unable to be powered by the tag reader, and thus, unable to transmit any data. When the first electrical contact 312 comes into physical contact with any one of the second set of electrical contacts 310A, 310B, 310C, the electrical circuit is completed and the tag reader 190 is able to energize the now completed antenna circuit. With the energized antenna, the stored data on the wireless chips 308A, 308B, 308C associated with the same branch as the contacted electrical contact 310A, 310B, 310C is transmitted on the now completed antenna circuit.

In this embodiment, the first half-antenna 302 and the second half-antenna 304 act like a switch that is useable to identify which branch (and associated electrical contact 310A, 310B, 310C) were contacted. For example, when the first electrical contact 312 is contacted with the second second-side contact 310B, the half-antennas 302 and 304 are energized, and the stored data on the wireless chips 308B, and only this stored data, is transmitted to the tag reader 190. With the stored data, the system 150 is able to match the received data to data stored in the database to identify which contact was contacted.

While the embodiment illustrated in FIG. 3 shows three parallel branches, it is understood that any suitable number of parallel branches could be used in this embodiment.

Figure 4:
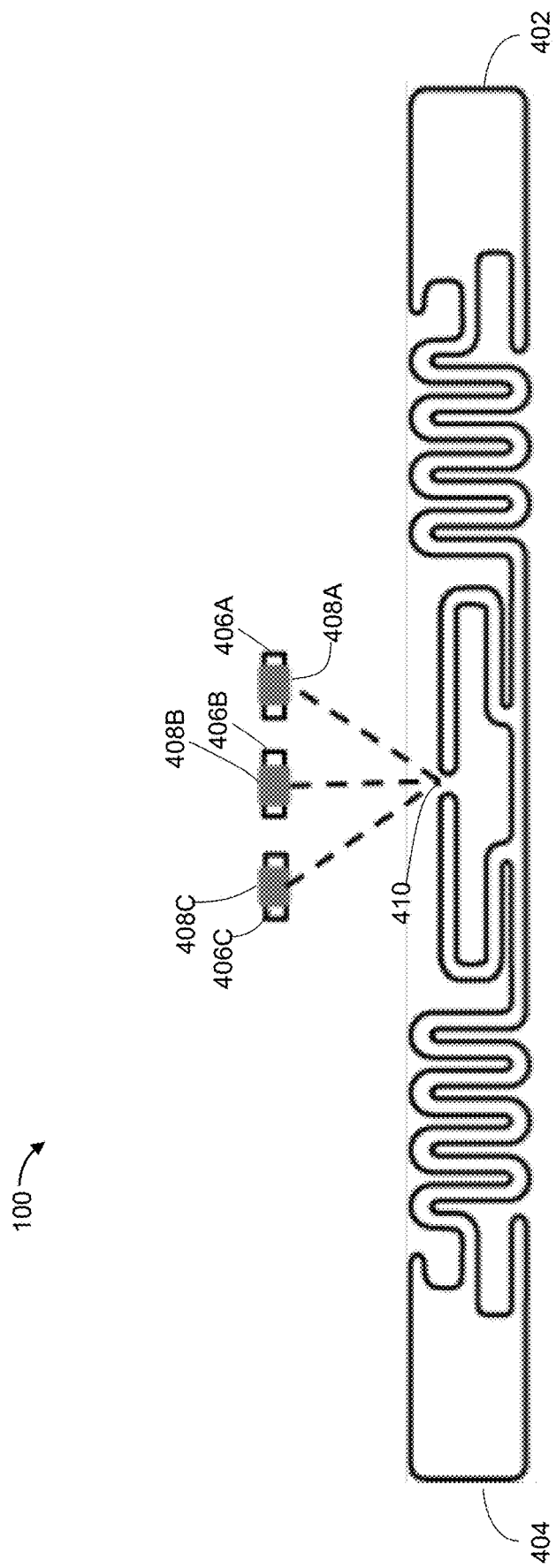
FIG. 4 illustrates a diagram for a wireless tag arrangement for a multi-positional switch, in accordance with yet another embodiment.

FIG. 4 illustrates a wireless tag 100 arrangement in accordance with another embodiment. In this embodiment, there are two half-antennas, a first half-antenna 402 and a second half-antenna 404. The first half-antenna 402 and the second half-antenna 404 are connected except for a gap 410. External to the first half-antenna 402 and the second half-antenna 404 are a set of electrical contacts 406A, 406B, 406C with a respective set of wireless chips 408A, 408B, 408C.

Due to the gap 410, the electrical circuit is not completed and the first half-antenna 402 and the second half-antenna 404 are unable to be powered by the tag reader; and thus, unable to transmit any data. When any one of the electrical contacts 406A, 406B, 406C is positioned into the gap 410, the electrical circuit is completed and the tag reader 190 is able to energize the now completed antenna circuit. With the energized antenna, the stored data on the wireless chips 408A, 408B, 408C associated with the electrical contact 406A, 406B, 406C positioned in the gap 410 is transmitted on the now completed antenna circuit.

In this embodiment, the first half-antenna 402 and the second half-antenna 404 act like a switch that is useable to identify which electrical contact 406A, 406B, 406C was positioned in the gap. For example, when the first electrical contact 406A is positioned in the gap, the first half-antenna 402 and the second half-antenna 404 are energized and the stored data on the associated wireless chips 408A, and only this stored data, is transmitted to the tag reader 190. With the received data, the system 150 is able to match the received data to data stored in the database to identify which contact was positioned in the gap 410.

While the embodiment illustrated in FIG. 4 shows three electrical contacts, it is understood that any suitable number of electrical contacts could be used in this embodiment.

Figure 5:
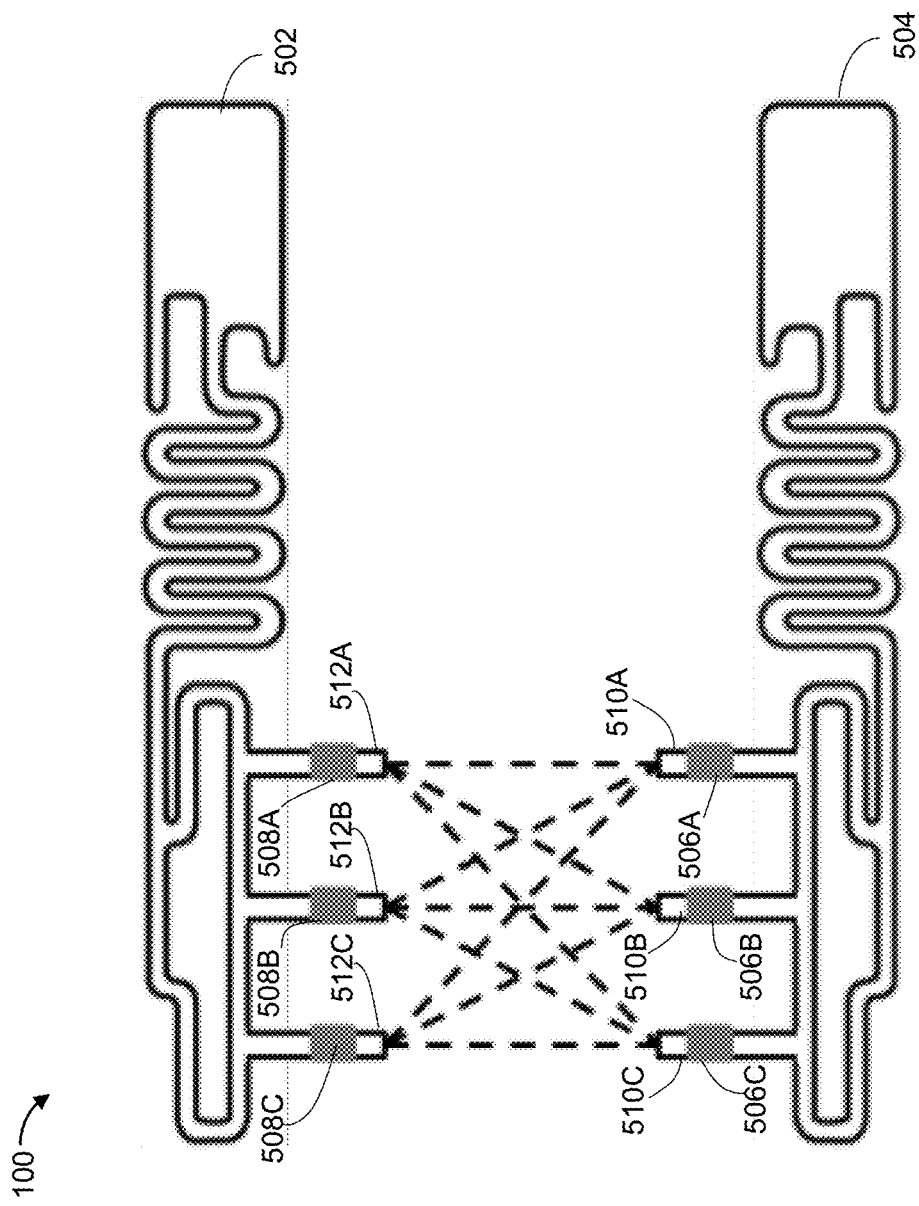
FIG. 5 illustrates a diagram for a wireless tag arrangement for a multi-positional switch, in accordance with yet another embodiment.

FIG. 5 illustrates a wireless tag 100 arrangement in accordance with another embodiment. In this embodiment, there are two half-antennas, a first half-antenna 502 and a second half-antenna 504. Connected to the first half-antenna 502 is a first set of wireless chips 508A, 508B, 508C arranged in a first set of parallel branches and connected to the second half-antenna 504 is a second set of wireless chips 506A, 506B, 506C arranged in a second set of parallel branches. Connected to the first half-antenna 502 are a first set of electrical contacts 512A, 512B, 512C, with each electrical contact 512A, 512B, 512C on a respective one of the first set of parallel branches. Connected to the second half-antenna 504 are a second set of electrical contacts 510A, 510B, 510C, with each electrical contact 510A, 510B, 510C on a respective one of the second set of parallel branches.

Again, each of the half-antennas 502, 504 alone are unable to be powered by the tag reader, and thus, unable to transmit any data. When one of the first set of electrical contacts 512A, 512B, 512C comes into physical contact with any one of the second set of electrical contacts 510A, 510B, 510C, the electrical circuit is completed and the tag reader 190 is able to energize the now completed antenna circuit. With the energized antenna, the stored data on the first set of wireless chips 508A, 508B, 508C associated with the same branch as the contacted electrical contact 512A, 512B, 512C, and the stored data on the second set of wireless chips 506A, 506B, 506C associated with the same branch as the contacted electrical contact 510A, 510B, 510C, are both transmitted on the now completed antenna circuit.

In this embodiment, the first half-antenna 502 and the second half-antenna 504 act like a switch that is useable to identify which branch of the first set of parallel branches (and associated electrical contact 512A, 512B, 512C), and which branch of the second set of parallel branches (and associated electrical contact 510A, 510B, 510C), were contacted. For example, when the first electrical contact 512A of the first set of electrical contacts is contacted with the second contact 510B of the second set of electrical contacts, the half-antennas 502 and 504 are energized, and the stored data on the associated wireless chips 508A and 506B, and only this stored data, is transmitted to the tag reader 190. With the received data, the system 150 is able to match the received data to data stored in the database to identify which contacts were contacted.

While the embodiment illustrated in FIG. 5 shows three parallel branches on each of the half-antennas, it is understood that any suitable number of parallel branches, on any suitable number of half-antennas, could be used in this embodiment.

Figure 6:
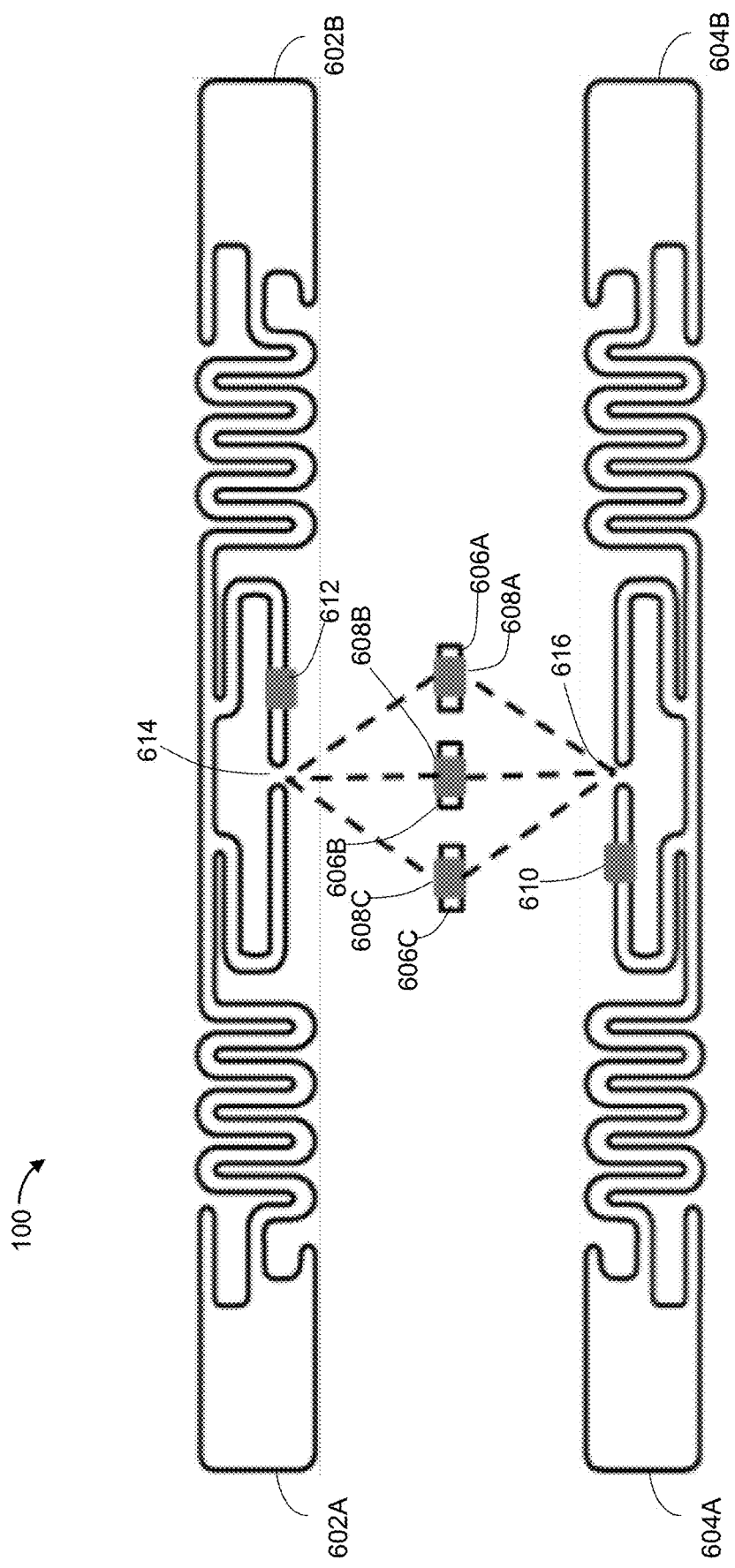
FIG. 6 illustrates a diagram for a wireless tag arrangement for a multi-positional switch, in accordance with yet another embodiment.

FIG. 6 illustrates a wireless tag 100 arrangement in accordance with another embodiment. In this embodiment, there are four 'half-antennas' in a two-by-two matrix. On a first-side of the matrix, there are two half-antennas 602A, 602B, and on a second-side of the matrix, there are two other half-antennas 604A, 604B. The two first-side half-antennas 602A, 602B are connected except for a first gap 614. The two second-side half-antennas 604A, 604B are connected except for a second gap 616. External to the half-antennas 602A, 602B, 604A, 604B are a set of external electrical contacts 606A, 606B, 606C with a respective set of external wireless chips 608A, 608B, 608C. Connected to one of the first-side half antennas 602A, 602B is a first proximal wireless chip 612 and connected to one of the second-side half antennas 604A, 604B is a second proximal wireless chip 610.

Due to the gaps 614, 616, the electrical circuit is not completed and the half-antennas 602A, 602B, 604A, 604B are unable to be powered by the tag reader; and thus, unable to transmit any data. When any one of the external electrical contacts 606A, 606B, 606C is positioned into the first gap 614, the electrical circuit of the first-side half-antennas 602A, 602B is completed and the tag reader 190 is able to energize the now completed antenna circuit. With the energized first-side half-antennas 602A, 602B, the stored data on the external wireless chips 608A, 608B, 608C associated with the electrical contact 606A, 606B, 606C positioned in the gap 614 and the first proximal wireless chip 612 are transmitted on the now completed antenna circuit. Conversely, when any one of the external electrical contacts 606A, 606B, 606C is positioned into the second gap 616, the electrical circuit of the second-side half-antennas 604A, 604B is completed and the tag reader 190 is able to energize the now completed antenna circuit. With the energized second-side half-antennas 604A, 604B, the stored data on the external wireless chips 608A, 608B, 608C associated with the electrical contact 606A, 606B, 606C positioned in the gap 616 and the second proximal wireless chip 610 is transmitted on the now completed antenna circuit.

In particular cases, the stored data on the wireless chips can comprise identification data, such as a unique identifier. In further cases, the stored data on each wireless chip can be any suitable data. For example, the stored data can be data received from connected sensors, such as light, humidity, and temperature readings. In this example, with the embodiments illustrated in FIGS. 4 and 6, a user could select what data to transmit by selecting which wireless chip (and associated electrical contact) is positioned in the gap.

In many cases, the size of the half-antennas can correspond to a wavelength transmitted by the completed antennas. In some cases, the half-antennas, wireless chips, and electrical contacts can be mounted on a suitable substrate, such as a paper substrate, a plastic substrate, printed circuit board, or the like.

Without limitation, the system 150 and wireless tags 100 are particularly suitable for receiving fingertip input. In example implementations, the present inventors developed a glove and a temporary tattoo that demonstrate the ability to use the present embodiments to create a battery-free multi-dimensional discrete fingertip input.

Figure 8B:
FIGS. 8A and 8B illustrate two photographic views of a glove implementation of the wireless tags of the system of FIG. 1.
Figure 8A:
Figures 9A, 9B, 9C:
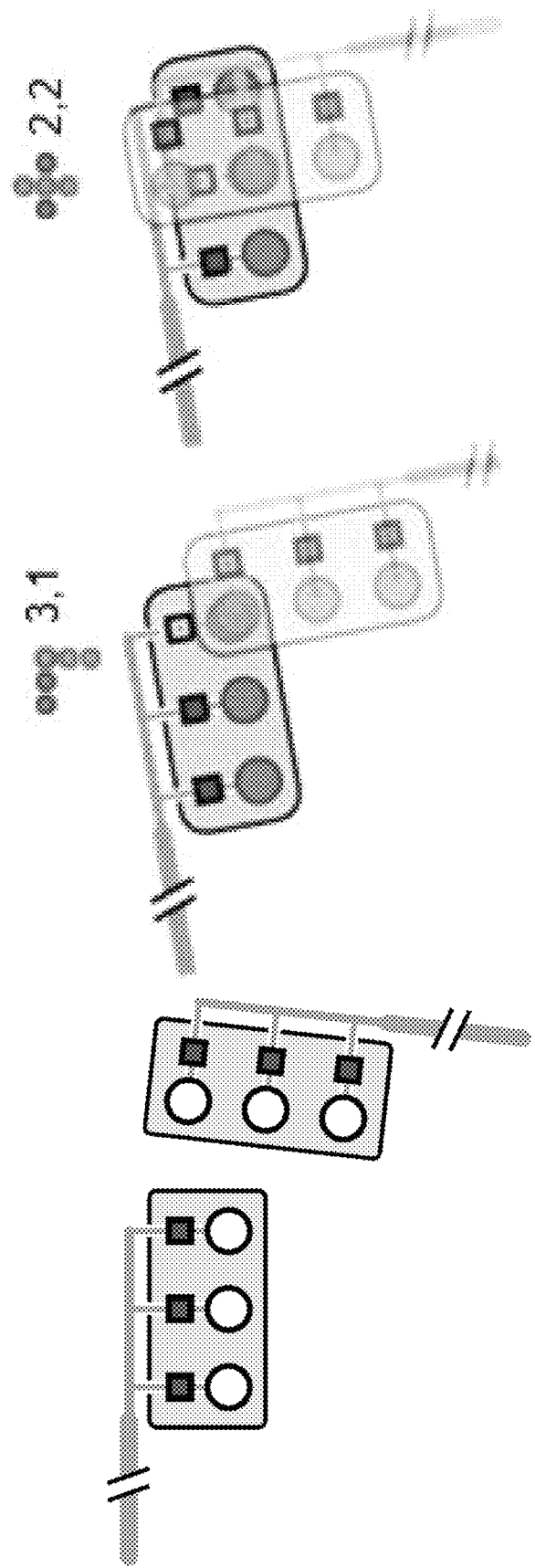
FIG. 9A illustrates a diagram of an example of two sets of three wireless chips and associated electrical contacts in accordance with the wireless tag arrangement of FIG. 5.
FIG. 9B illustrates a diagram of an example arrangement of contacted electrical contacts in accordance with the wireless contacts of FIG. 9A.
FIG. 9C illustrates a diagram of another example arrangement of contacted electrical contacts in accordance with the wireless contacts of FIG. 9A.

As illustrated in the two views of FIGS. 8A and 8B, a glove implementation includes a first set of contacts 802 and a second set of contacts 804. In this example, the first set of contacts 802 associated with the first set of electrical contacts 512A, 512B, 512C of the embodiment of FIG. 5. The second set of contacts 804 associated with the second set of electrical contacts 510A, 510B, 510C of the embodiment of FIG. 5. In this example, the wireless chips comprise Ultra high frequency (UHF) RFID chips (Alien Higgs-3 SOT IC). When one of the first set of contacts 802 comes into physical contact with one of the second set of contacts 804, a complete antenna circuit is created, and two RFID chips are connected in series to a single antenna comprised of the two half-antennas 502, 504. As illustrated in the examples of FIGS. 9A to 9C, by attaching one finger pad to an index finger, and another one to a thumb, the system 150 can detect two-dimensional switch positions.

Figure 10:
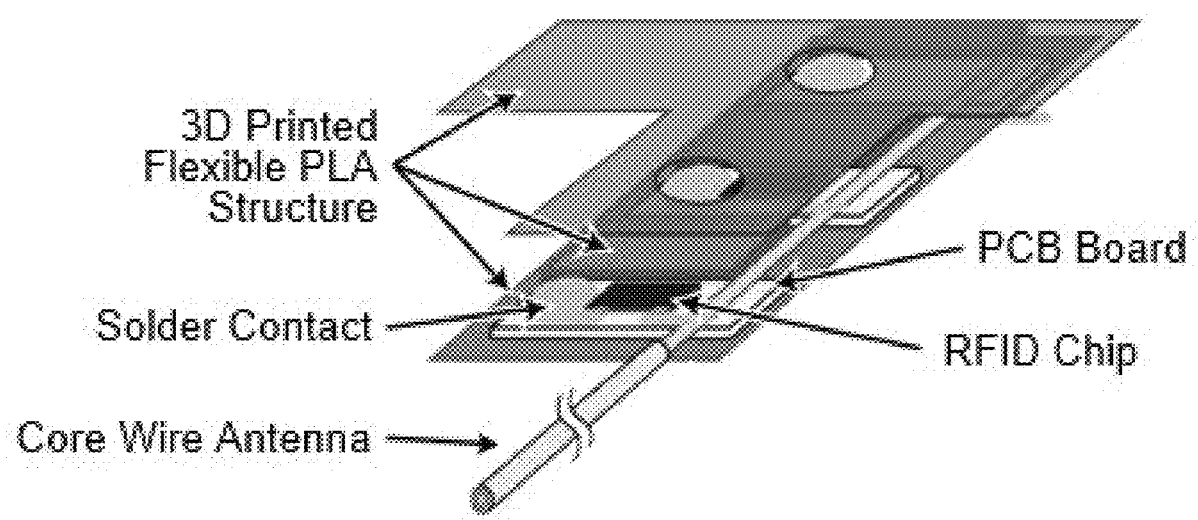
FIG. 10 illustrates a diagram of a physical structure of a finger pad in accordance with the glove implementation of FIGS. 8A and 8B.

As illustrated in FIG. 10, the present inventors used flexible wire with a length of 8 cm (i.e. half a wavelength of the RFID signal) as half of a dipole antenna. Three RFID chips were soldered to each wire. Specifically, each RFID chip having two terminals, one terminal of the chip was soldered to the wire and the other to an electrical contact that is left open. In this case, for the thumb pad, metal bumps were used as electrical contacts, and for the index finger, small flat metal pieces covered with copper sheet were used as electrical contacts to create a smooth surface. 3D printed flexible PLA structure was used to hold the chips in place. The half-antennas were routed to the back of gloves to minimize the attenuation of radio frequency (RF) signals by the hand.

Figure 11B:
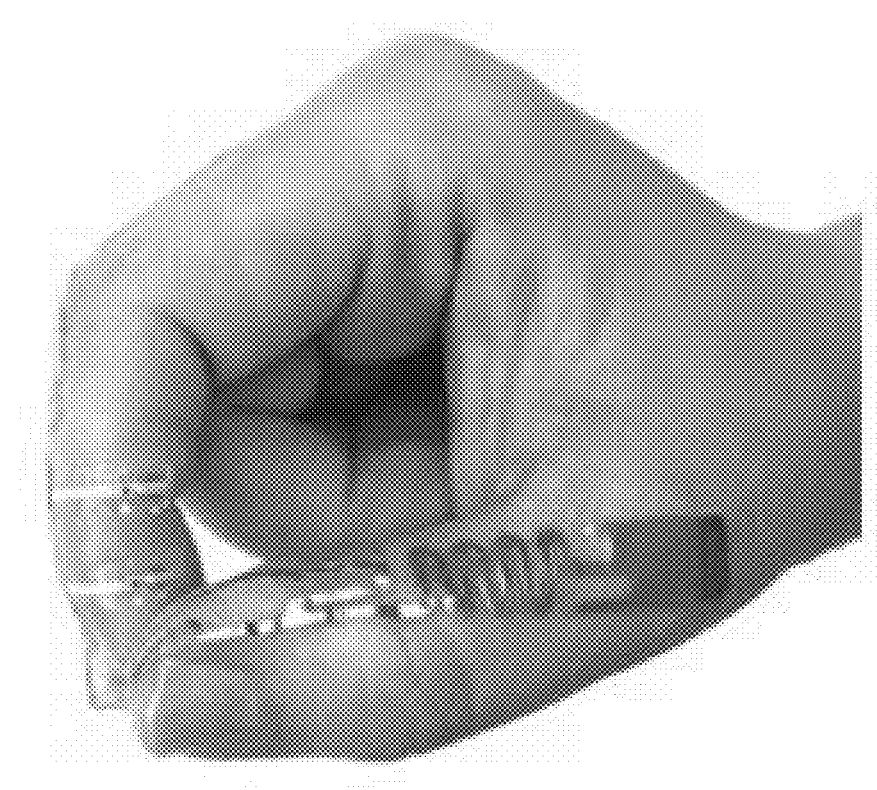
FIGS. 11A and 11B illustrate two photographic views of a temporary tattoo implementation of the wireless tags of the system of FIG. 1.
Figure 11A:

As illustrated in the two views of FIGS. 11A and 11B, temporary tattoo paper was used to apply a custom multi-chip RFID tag directly to a user's hand. To make the half-antennas, a modified shape was created based on Alien Squiggle ALN-9740 RFID tags. To reduce how much the body absorbs and dissipates RF energy, relatively long connection traces between the chips and the half-antennas was used to minimize tag occlusion. A vinyl cutting machine was used to cut the copper tape into the half-antenna shapes, and these were placed on tattoo papers. One terminal of each RFID chip is attached to a branch of each half-antenna and a small magnet is placed behind the other chip terminal to create a reliable electrical contact. The two tattoo papers, each with 3 chips and a half-antenna, were affixed to the skin with temporary tattoo adhesive.

For the UHF RFID reader of these example implementations, a IMPINJ Speedway Revolution R420 with a panel RFID antenna (59028PCR/58658PR) was used. Whenever the reader detected an RFID chip, it sent the chip identification (ID) to the system 150 which was run on a notebook computer using the Octane SDK .NET (version 2.30.2) via an Ethernet cable. The RFID reader operated at 30 dBm. Using a database of identification numbers located on the system 150, whenever a pair of chip IDs on the index finger and thumb were detected, the system 150 recognized a touch event and determined which contacts were touching.

The glove implementation can have a number of useful applications. For example, factory workers and machine operators often wear thick work gloves, making it hard to control small switches or use a keyboard or touch panel.

With the glove implementation, they could issue key commands (e.g. stop, start, next, previous, etc.) to a nearby display or control panel without taking off their gloves or approaching it.

The temporary tattoo implementation can also have a number of useful applications. It could be applied to thin latex gloves, such that lab workers or surgeons could issue commands to a computer. For example, surgeons could navigate a 3D scan of the patient's anatomy used to guide a complex procedure (e.g., up, down, left, right, in, out, prev, next, etc.). In this way, there is no contamination risk from using a touch screen or mouse, the commands can be issued in a subtle way without moving far from the surgical site, and the cost would be low enough that they can be discarded after use (as is common practice for surgical gloves).

In some cases, only the electrical contact (with or without the wireless chip) has to be on the user's body while the antenna need not be on the finger. While the above implementations illustrate the suitability of the present embodiments to receive fingertip input, it is understood that the multi-positional switch using a passive wireless tag of the present embodiments can be attached to any position of the body to receive input. For example, an electrical contact associated with one or more wireless chips can be positioned on a finger and another electrical contact positioned on another part of the body.

In some cases, such as for embodiments illustrated in FIGS. 4 and 6, the external wireless chips, and associated electrical contacts, can each be attached to an article associated with a separate user and each set of one or more half-antennas mounted on a separate object; or the external wireless chips, and associated electrical contacts, can each be attached to an object and each set of one or more half-antennas attached to an article associated with a separate user. In further cases, in accordance with other embodiments, half-antennas, with associated wireless chips, can be located on an article associated with each user, and half-antennas, with associated wireless chips, can be located on each object. In either of these approaches, the tag processing module 172 can detect who is touching which object by cross-referencing the received identification data with identification data stored on the database 166 associated with the object and/or the user.

The present embodiments provide substantial advantages over other approaches that use RFID tags to detect touch events because such approaches cannot detect where is being touched, what is being touched, or which part of the body is doing the touching the object. The present embodiments are also advantageous over other multiple antenna approaches that have full antennas because such approaches are largely subject to potential interference between the antennas and there are severe limitations over placement of the multiple antennas.

Advantageously, the present embodiments allow for creating a battery-free switch using sets of wireless chips attached to two incomplete half-antennas to detect different combinations of inputs. Advantageously, the wireless tag 100 arrangements can use conductive traces and chips that are take up a small footprint (e.g., less than 1 mm square), that are very thin, and that are low cost.

Although the invention has been described with reference to certain specific embodiments, various modifications thereof will be apparent to those skilled in the art. The scope of the claims should not be limited by the preferred embodiments but should be given the broadest interpretation consistent with the description as a whole.

The invention claimed is:

1. A multi-positional switch using a passive wireless tag to communicate with a wireless tag reader, the wireless tag comprising:
   a first set of one or more half-antennas each comprising one or more electrical contacts;
   a second set of one or more half-antennas each comprising one or more electrical contacts; and
   a first set of two or more wireless chips and an electrical contact connected to an open end of each of the wireless chips, each of the wireless chips comprising data stored thereon, and
   when one of the electrical contacts completes an antenna circuit comprising contacting the electrical contact of one of the first set of half-antennas and the electrical contact of one of the second set of half antennas, the wireless tag reader energizes the completed antenna circuit and the completed antenna circuit transmits the data stored on the wireless chip that is connected to the electrical contact that is completing the antenna circuit to the wireless tag reader.

2. The multi-positional switch of claim 1, wherein the first set of two or more wireless chips are connected to the first set of one or more half-antennas, and the wireless tag further comprising a second set of two or more wireless chips and an electrical contact connected to an open end of each of the second set of two or more wireless chips, each of the second set of two or more wireless chips comprising data stored thereon, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

3. The multi-positional switch of claim 1, wherein each half-antenna in the first set of one or more half-antennas comprises an electrical contact, and wherein the first set of two or more wireless chips are each connected to parallel branches of the half-antennas in the second set of one or more half-antennas, and wherein one of the electrical contacts of the first set of two or more wireless chips completes the antenna circuit when physically contacted with the electrical contact connected to the half-antenna in the first set of one or more half-antennas.

4. The multi-positional switch of claim 1, wherein the first set of two or more wireless chips and the connected electrical contacts are external to the first set of one or more half-antennas and the second set of one or more half-antennas.

5. The multi-positional switch of claim 1, the wireless tag further comprising a second set of two or more wireless chips and an electrical contact connected to an open end of each of the second set of two or more wireless chips, each of the second set of two or more wireless chips comprising data stored thereon, the second set of two or more wireless chips are each connected to parallel branches of the half-antennas in the second set of one or more half-antennas, and wherein the first set of two or more wireless chips are each connected to parallel branches of the half-antennas in the first set of one or more half-antennas, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

6. The multi-positional switch of claim 1, wherein the first set of two or more wireless chips and the connected electrical contacts are external to the first set of one or more half-antennas and the second set of one or more half-antennas, and wherein a first antenna circuit comprises one of the half-antennas in the first set of half-antennas partially connected with one of the half-antennas in the second set of half-antennas, the first antenna circuit further comprising a first proximal wireless chip and an electrical contact connected to an open end of the first proximal wireless chip, the first proximal wireless chip comprising data stored thereon, and wherein a second antenna circuit comprises a further one of the half-antennas in the first set of half-antennas partially connected with a further one of the half-antennas in the second set of half-antennas, the second antenna circuit further comprising a second proximal wireless chip and an electrical contact connected to an open end of the second proximal wireless chip, the second proximal wireless chip comprising data stored thereon, and wherein one of the electrical contacts of the first set of two or more wireless chips completes the antenna circuit when physically contacted with either the electrical contact connected to the first proximal wireless chip or the second proximal wireless chip, transmitting the data stored on both the wireless chips that are connected to the contacted electrical contacts.

7. The multi-positional switch of claim 1, wherein the first set of one or more half-antennas are positioned on a first body part of a user and the second set of one or more half-antennas are positioned on a second body part of a user, and wherein the first set of two or more wireless chips and connected electrical contacts are connected to either the first set of one or more half-antennas or the second set of one or more half-antennas, allowing the user to make a selection by completing the antenna circuit by bringing the one of the half-antennas in the first set of one or more half-antennas in contact with one of the half-antennas in the second set of one or more half-antennas.

8. The multi-positional switch of claim 7, wherein the first body part comprises a finger of the user and the second body part comprises a thumb of the user.

9. The multi-positional switch of claim 8, wherein the first set of one or more half-antennas are mounted on the finger of a glove and the second set of one or more half-antennas are mounted on the thumb of the glove.

10. The multi-positional switch of claim 8, wherein the first set of one or more half-antennas are mounted on a temporary tattoo attached to the finger of the user and the second set of one or more half-antennas are mounted on a temporary tattoo attached to the thumb of the user.

11. The multi-positional switch of claim 1, wherein each wireless chip in the first set of two or more wireless chips are attached to an article of a separate user and the first set of half-antennas and the second set of half-antennas are mounted on an object, the data stored on the wireless chips useable to determine which user is causing the electrical contacts to complete the antenna circuit.

12. The multi-positional switch of claim 1, wherein each wireless chip in the first set of two or more wireless chips are mounted to a separate object and the first set of half-antennas and the second set of half-antennas are attached to an article of a user, the data stored on the wireless chips useable to determine which object the user is touching to cause the electrical contacts to complete the antenna circuit.

13. The multi-positional switch of claim 1, the wireless tag further comprising a second set of two or more wireless chips and an electrical contact connected to an open end of each of the second set of two or more wireless chips, each of the second set of two or more wireless chips comprising data stored thereon, and wherein each antenna in the first set of half-antennas, and an associated wireless chip from the first set of two or more wireless chips, are mounted to a separate object, and wherein each antenna in the second set of half-antennas, and an associated wireless chip from the second set of two or more wireless chips, are attached to an article of a separate user, the data stored on the wireless chips useable to determine which user is causing the electrical contacts to complete the antenna circuit and which object such user is touching.

14. A system for multi-positional switching using a passive wireless tag to communicate with a wireless tag reader, the wireless tag comprising a first set of one or more half-antennas each comprising one or more electrical contacts, a second set of one or more half-antennas each comprising one or more electrical contacts, and a first set of two or more wireless chips and an electrical contact connected to an open end of each of the wireless chips, each of the wireless chips comprising data stored thereon, and when one of the electrical contacts completes an antenna circuit comprising contacting the electrical contact of one of the first set of half-antennas and the electrical contact of one of the second set of half antennas, the wireless tag reader energizes the completed antenna circuit and the completed antenna circuit transmits the data stored on the wireless chip connected to the electrical contact that is completing the antenna circuit to the wireless tag reader, the system comprising one or more processors in communication with a data storage, the one or more processors configurable to execute:
    an input module to receive the transmitted data from the wireless chip reader;
    a tag processing module to compare the received data against data stored in the data storage, the received data in the data storage associated with the corresponding electrical contact in order to identify which one of the electrical contacts completed the circuit; and
    an output module to output the identified electrical contact.

15. The system of claim 14, wherein the first set of two or more wireless chips are connected to the first set of one or more half-antennas, and the wireless tag further comprises a second set of two or more wireless chips and an electrical contact connected to an open end of each of the second set of two or more wireless chips, each of the second set of two or more wireless chips comprising data stored thereon, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

16. The system of claim 14, wherein each half-antenna in the first set of one or more half-antennas comprises an electrical contact, and wherein the first set of two or more wireless chips are each connected to parallel branches of the half-antennas in the second set of one or more half-antennas, and wherein one of the electrical contacts of the first set of two or more wireless chips completes the antenna circuit when physically contacted with the electrical contact connected to the half-antenna in the first set of one or more half-antennas.

17. The system of claim 14, wherein the first set of two or more wireless chips and the connected electrical contacts are external to the first set of one or more half-antennas and the second set of one or more half-antennas.

18. The system of claim 14, the wireless tag further comprising a second set of two or more wireless chips and an electrical contact connected to an open end of each of the second set of two or more wireless chips, each of the second set of two or more wireless chips comprising data stored thereon, the second set of two or more wireless chips are each connected to parallel branches of the half-antennas in the second set of one or more half-antennas, and wherein the first set of two or more wireless chips are each connected to parallel branches of the half-antennas in the first set of one or more half-antennas, and wherein one of the electrical contacts of the first set of two or more wireless chips completes the antenna circuit when physically contacted with one of the electrical contacts connected to the second set of two or more wireless chips, transmitting the data stored on both the wireless chips that are connected to the contacted electrical contacts.

19. The system of claim 14, wherein the first set of two or more wireless chips and the connected electrical contacts are external to the first set of one or more half-antennas and the second set of one or more half-antennas, and wherein a first antenna circuit comprises one of the half-antennas in the first set of half-antennas partially connected with one of the half-antennas in the second set of half-antennas, the first antenna circuit further comprising a first proximal wireless chip and an electrical contact connected to an open end of the first proximal wireless chip, the first proximal wireless chip comprising data stored thereon, and wherein a second antenna circuit comprises a further one of the half-antennas in the first set of half-antennas partially connected with a further one of the half-antennas in the second set of half-antennas, the second antenna circuit further comprising a second proximal wireless chip and an electrical contact connected to an open end of the second proximal wireless chip, the second proximal wireless chip comprising data stored thereon, and wherein one of the electrical contacts of the first set of two or more wireless chips completes the antenna circuit when physically contacted with either the electrical contact connected to the first proximal wireless chip or the second proximal wireless chip, transmitting the data stored on both the wireless chips that are connected to the contacted electrical contacts.

20. A method for multi-positional switching using a passive wireless tag to communicate with a wireless tag reader, the wireless tag comprising a first set of one or more half-antennas each comprising one or more electrical contacts, a second set of one or more half-antennas each comprising one or more electrical contacts, and a first set of two or more wireless chips and an electrical contact connected to an open end of each of the wireless chips, each of the wireless chips comprising data stored thereon, and when one of the electrical contacts completes an antenna circuit comprising contacting the electrical contact of one of the first set of half-antennas and the electrical contact of one of the second set of half antennas, the wireless tag reader energizes the completed antenna circuit and the completed antenna circuit transmits the data stored on the wireless chip connected to the electrical contact that is completing the antenna circuit to the wireless tag reader, the method comprising:

receiving the transmitted data from the wireless chip reader;

comparing the received data against data stored on a database, the stored data associated with the corresponding electrical contact in order to identify which one of the electrical contacts completed the circuit; and outputting the identified electrical contact.

\* \* \* \* \*